United States Patent [19]

Meyer et al.

[11] Patent Number: 4,491,155
[45] Date of Patent: Jan. 1, 1985

[54] MULTIWAY SLIDE VALVE

[75] Inventors: Hans-Friedrich Meyer, Gehrden; Wolfgang Thiele, Hanover; Hermann Kosmalski, Hanover; Klaus Meurer, Hanover; Hans Kruppa, Barsinghausen; Helmut Göttling, Isernhagen; Ernst-August Meyer, Algermissen, all of Fed. Rep. of Germany

[73] Assignee: WABCO Steuerungstechnik GmbH, Hanover, Fed. Rep. of Germany

[21] Appl. No.: 578,300

[22] Filed: Feb. 9, 1984

Related U.S. Application Data

[63] Continuation of Ser. No. 315,828, Oct. 28, 1981, abandoned.

[30] Foreign Application Priority Data

Nov. 21, 1980 [DE] Fed. Rep. of Germany ....... 3043871

[51] Int. Cl.³ .................... F15B 13/042; F16K 11/07
[52] U.S. Cl. ......................... 137/625.66; 137/625.69; 251/324; 251/363
[58] Field of Search .................. 137/625.66, 625.69; 251/63.5, 324, 363

[56] References Cited

U.S. PATENT DOCUMENTS 3,621,862 11/1971 Wojtecki.

FOREIGN PATENT DOCUMENTS

| | | |
|---|---|---|
| 832226 | 2/1952 | Fed. Rep. of Germany. |
| 1061147 | 7/1959 | Fed. Rep. of Germany. |
| 2160467 | 7/1972 | Fed. Rep. of Germany. |
| 7121453 | 7/1972 | Fed. Rep. of Germany. |
| 2306480 | 8/1973 | Fed. Rep. of Germany. |
| 2751794 | 5/1979 | Fed. Rep. of Germany. |
| 1388659 | 1/1965 | France. |
| 557490 | 12/1974 | Switzerland. |

Primary Examiner—Gerald A. Michalsky
Attorney, Agent, or Firm—J. B. Sotak

[57] ABSTRACT

A multiway slide valve having a housing provided with a graduated cylindrical guide bore, a pressure inlet port, and a pair of pressure outlets ports. A preassembled valve seat unit including a plurality of annular spacers which carry sealing rings having respective diameters corresponding to the graduations of the guide bore so that damage to the sealing rings is prevented when inserted into the graduated cylindrical guide bore. A slide spool and jacket inserted into the guide bore. A cover attached to the housing for depressing the jacket which causes deformation of the sealing rings to provide a tight seal between the graduations of the guide bore and the slide spool.

10 Claims, 1 Drawing Figure

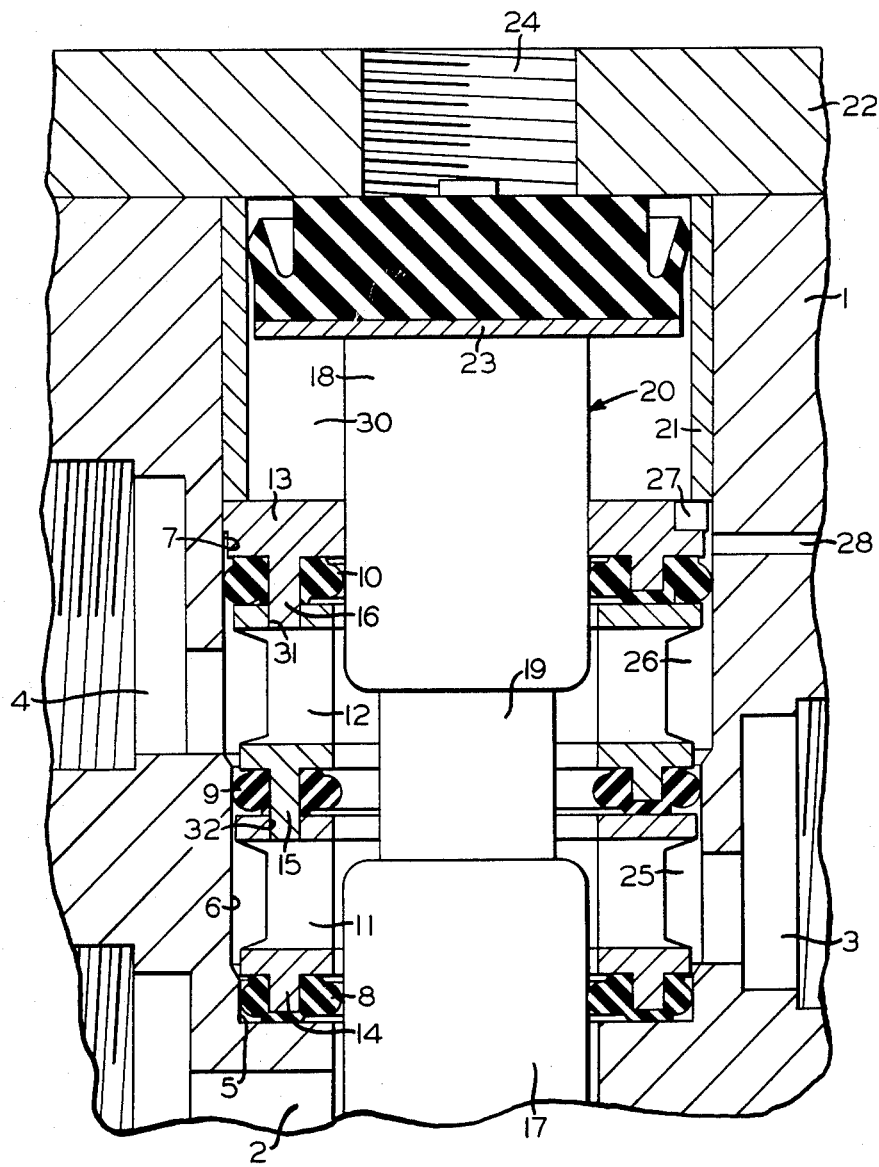

MULTIWAY SLIDE VALVE

This application is a continuation of application Ser. No. 315,828, filed Oct. 28, 1981 now abandoned.

FIELD OF THE INVENTION

This invention relates to a slide valve and more particularly to a multiway slide valve having a housing provided with a cylindrical guide bore, and at least one pressure inlet port and one pressure outlet port, a slide spool is sealed within the housing, a plurality of seals and spacers are disposed within a cylindrical guide bore to define pressure chambers, the cylindrical guide bore which holds the seals and spacers. is graduated into sections, each of the graduated sections accommodating at least one seal having a diameter substantially corresponding to the diameter of the associated graduated section.

BACKGROUND OF THE INVENTION

In certain valve structures, such as, in the multiway valve shown and disclosed in German patent No. 1,290,397, the spacers, washers and sealing elements which are required for the sealing subassembly are usually manufactured as individual parts, and, during assembly of the valve, these parts are also inserted singly into the central guide bore provided in the valve housing. Since all of the individual spacers, washers and sealing elements have approximately the same diameter as the central guide bore, an impairment may occur during assembly. That is, when the spacers, gaskets and sealing elements are being inserted into the guide bore, the sealing elements might be damaged by the adjoining edges of the pressure inlet parts and/or pressure outlet ports or the spacers may become canted which can create rough spots on the cylinder wall of the guide bore and which, in turn, can subsequently result in leakage problems.

OBJECTS OF THE INVENTION

Accordingly, it is an object of this invention to provide a unique multiway slide valve which facilitates and which reduces possible damage to the individual parts of the valve.

Another object of this invention is to provide a new and improved slide valve having a graduated cylindrical guide bore for accommodating a plurality of spacers and sealing rings of different diameters.

A further object of this invention is to provide a novel pilot actuated valve having a cylindrical guide bore which has a plurality of sections of different diameters for receiving corresponding spacers and seals which define receiving and discharge chambers.

Yet another object of this invention is to provide a multiway slide valve having a housing which includes a cylindrical guide bore, the housing includes at least one pressure inlet port and one pressure outlet port, at least two sealing rings and a separating spacer are disposed within the cylindrical guide bore for defining a pressure chamber, a slide spool cooperates with the sealing rings for selectively establishing communications between the pressure inlet port and the pressure outlet port through the pressure chamber, and the cylindrical guide bore is graduated into sections which have different diameters for facilitating assemblage of the valve and for reducing damage to the valve.

Yet a further object of this invention is to provide a new and improved multiway slide valve which is economical in cost, simple in construction, unique in design, efficient in operation, dependable in service, durable in use, and easy to manufacture.

SUMMARY OF THE INVENTION

In the attainment of the above objects, there is provided a multiway slide valve having a housing which includes a graduated cylindrical guide bore. The housing includes a pressure inlet port, a first pressure outlet port and a second pressure outlet port. A preassembled valve seat assembly is inserted into the graduated cylindrical guide bore. The valve seat assembly includes a plurality of sealing rings and annular spacers. The diameter of the plurality of sealing rings substantially corresponds to the associated graduation of the guide bore so that damage to the sealing rings is prevented. The sealing rings are carried by the spacers which include projections and recesses for interconnection as an integral unit. A slide spool and jacket are inserted into the guide bore. The jacket serves as a guide for the operating piston and causes the deformation of the sealing rings to provide a tight seal between the slide spool and graduations of the guide bore.

DESCRIPTION OF THE DRAWING

The above objects and other attendant features and advantages of the present invention will become more readily apparent from the following detailed description when considered and reviewed in conjunction with the accompanying drawing, in which:

The single FIGURE is a vertical sectional view of a multiway slide valve having a graduated cylindrical guide bore for accommodating a three spacer and sealing ring assemblage.

DETAILED DESCRIPTION OF THE INVENTION

Referring now to the single FIGURE, there is shown a housing 1 having a pressure inlet port 2, a first pressure outlet port 3 and a second pressure outlet port 4. The inlet port 2 is connected to a suitable source of air or fluid pressure (not shown). The first outlet port 3 is connected to a load, such as, a receiver, while the second outlet port 4 is vented to the atmosphere. As shown, the valve housing 1 is provided with a cylindrical guide bore which includes three stepped portions or graduated sections 5, 6 and 7. It will be seen that the diameter of each of the cylindrical sections 5, 6 and 7 is different, and in fact, the diameters increase from bottom to top of the guide bore. The sections 5, 6 and 7 each accommodate one of three respective sealing rings 8, 9 and 10. The three rings are located in the guide bore and are combined or associated with one of three annular spacers 11, 12 and 13. Each spacer and an associated sealing ring form separate sealing units, namely, spacer 11, seal 8; spacer 12, seal 9; spacer 13, seal 10; combinations. The upper two spacer seal combinations 12, 9 and 13, 10 are provided, at their lower surfaces or sides, with several depending projections 15 or 16, respectively. The ends of projections 15 and 16 are fitted into and are engaged with corresponding recesses 32 and 31 provided in the respective spacer seal combinations 11, 8 and 12, 9 which are located underneath combinations 12, 9 and 13, 10, respectively. As shown, a slide spool 20 is disposed centrally within the annular spacers and sealing rings. The spool 20 comprises two enlarged cylindrical end portions 17, 18 and an intermediate narrowed-down portion 19. Thus, the outer peripheral surfaces of the two cylindrical end portions 17, 18 cooperate with the inner surfaces or edges of the sealing rings 8, 9 and 10 to provide a guide for the spool 20. In practice, the spacer seal units are placed in stacked relationship in the graduated sections 5, 6 and 7 of the guide bore. It will be appreciated that the outer diameters of the sealing rings 8, 9 and 10 correspond to the inner peripheral surfaces of sections 5, 6 and 7, respectively. Initially, the sealing rings 8, 9 and 10 loosely fit into the sections 5, 6 and 7, and a given amount of compression is exerted on the sealing units by means of a jacket or sleeve member 21. Thus, after placement of the jacket 21, the spool and its actuating piston 23 are inserted in the guide bore. Next, a cover plate 22 is fastened to the top of housing 1. The cover urges the jacket 21 downwardly into the guide bore which causes the spacer to slightly compress the sealing rings 8, 9 and 10. Thus, the slightly flatened sealing rings fit tightly against sections 5, 6 and 7 and the periphery of the enlarged portions 17 and 18 of spool 20. It will be appreciated that the jacket 21 also serves as a travel surface for operating piston 23. A threaded opening 24 is formed in the cover 22 to provide a connection to a suitable source of pilot operating pressure (not shown) for moving the slide spool 20 downwardly by the piston 23. The sealing ring 8 along with spacer 11 which together with the bottom enlarged port 17 of spool 20 form an intake valve. Thus, the pressure inlet port 2 can be selectively connected to the receiver via a chamber 25 and the pressure outlet port 3.

The sealing ring 9, which has a larger diameter than the sealing ring 8, along with spacer 12 together with the top enlarged portion 18 form a discharge valve. Thus, the pressure outlet port 3, which is connected to the receiver can be selectively connected to the pressure outlet port 4 leading to atmosphere via a discharge chamber 26.

It will be seen that the pressure outlet port 4 and the discharge chamber 26 is closed off at the top by sealing ring 10, which has a larger diameter than the sealing ring 9, along with spacer 13.

The right top edge of the spacer 13 and a recess 27 which together with a bore 28 which is located in the side wall of housing 1 form a vent for the space 30 located between the top of the spacer 13 and the underside of the operating piston 23.

During the assembling of the multiway slide valve, the individual spacer seal combinations or sealing units are initially joined together. For example, the spacer 12 and sealing ring combination is initially stacked onto the spacer 11 and sealing ring 8 combination which, in turn, receives the spacer 13 and sealing ring 10 combination. Thus, these three spacer and seal combinations are stacked together to form a unitary valve seat assembly. The preassembled valve seat assembly is now inserted as an integral structure into the graduated guide bore of housing 1. Since the diameter of the guide bore, as viewed in the single FIGURE, is reduced in stages, the individual spacer and sealing ring combinations are readily received in the associated graduated sections of the guide bore. Thus, the flexible sealing rings do not come into excessive contact with any sharp edges of the pressure outlet port 3 and the pressure outlet port 4 during assembly, so that damage to the sealing rings is prevented.

As previously mentioned, the casing or jacket 21 not only anchors the valve seat assembly but also functions as the sliding surface for the operating packing cup and piston 23.

It will be appreciated that it is possible to permanently join the sealing ring spacer combinations or sealing ring units and the spacers by being tied together or by means of cementing, vulcanizing or welding.

It will be understood that various alterations and changes may be made by those skilled in the art without departing from the spirit and scope of the subject invention. For example, the number of sealing rings and spacers and the number of offsets in the guide bore may vary depending upon the required number of intake and discharge chambers and inlet and outlet ports. Therefore, it will be appreciated that any and all modifications, variations, ramifications and equivalents will be readily comprehended by persons skilled in the art and, therefore, it is understood that the invention is not limited to the specific embodiment described herein but is to be accorded the full scope and protection of the appended claims.

Having thus described the invention, what we claim as new and desire to secure by Letters Patent, is:

1. A multiway slide valve having a housing which includes a cylindrical guide bore, said housing includes at least one pressure inlet port and one pressure outlet port, a preassembled unitary valve assembly formed by a plurality of sealing rings and separating spacers, adjacent ones of said plurality of separating spacers are collectively interconnected together by projections which pass through said sealing rings and mate with recesses, said plurality of sealing rings and separating spacers concurrently disposed within said cylindrical guide bore for defining a pressure chamber, a slide spool cooperates with said sealing rings for selectively establishing communication between said pressure inlet port and said pressure outlet port through said pressure chamber, and said cylindrical guide bore is graduated into sections which have different diameters for facilitating insertion of the valve assembly and for reducing damage to the valve assembly.

2. The multiway slide valve as defined in claim 1, wherein the diameters of said sections progressively decrease in size.

3. The multiway slide valve as defined in claim 1, wherein a sealing ring and a spacer are preassembled prior to insertion into said cylindrical guide bore.

4. The multiway slide valve as defined in claim 1, wherein a pilot operating pressure actuating piston causes said slide spool to move from one extreme position to a second extreme position.

5. The multiway slide valve as defined in claim 4, wherein a sleeve member guides said actuating piston and causes deformation of said sealing rings to provide a tight seal between said slide spool and said cylindrical guide bore.

6. The multiway slide valve as defined in claim 1, wherein a sealing ring and a spacer form a preassembled sealing unit which is subsequently placed into said cylindrical guide bore.

7. The multiway slide valve as defined in claim 6, wherein a plurality of said preassembled sealing units are placed in stacked relationship in said cylindrical guide bore.

8. The multiway slide valve as defined in claim 6, wherein adjacent ones of a plurality of said preassembled sealing units are snap-connected together.

9. The multiway slide valve as defined in claim 6, wherein three of said preassembled sealing units are situated in said cylindrical guide bore.

10. The multiway slide valve as defined in claim 9, wherein the sealing rings of said three of said preassembled sealing units progressively decrease in size.

* * * * *